US010138560B2

(12) United States Patent
Reyes et al.

(10) Patent No.: US 10,138,560 B2
(45) Date of Patent: Nov. 27, 2018

(54) METHODS AND SYSTEMS UTILIZING A BORON-CONTAINING CORROSION INHIBITOR FOR PROTECTION OF TITANIUM SURFACES

(71) Applicant: Halliburton Energy Services, Inc., Houston, TX (US)

(72) Inventors: Enrique Antonio Reyes, Tomball, TX (US); Aaron M. Beuterbaugh, Spring, TX (US); Andrew Slocum, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/254,073

(22) Filed: Sep. 1, 2016

(65) Prior Publication Data
US 2016/0369408 A1    Dec. 22, 2016

Related U.S. Application Data

(63) Continuation-in-part of application No. 14/818,660, filed on Aug. 5, 2015.

(60) Provisional application No. 62/131,487, filed on Mar. 11, 2015.

(51) Int. Cl.
| | |
|---|---|
| *C09K 8/54* | (2006.01) |
| *E21B 41/02* | (2006.01) |
| *C23F 11/04* | (2006.01) |
| *C09K 8/74* | (2006.01) |
| *C23F 11/08* | (2006.01) |
| *C23F 11/18* | (2006.01) |

(52) U.S. Cl.
CPC ............... *C23F 11/04* (2013.01); *C09K 8/54* (2013.01); *C09K 8/74* (2013.01); *C23F 11/08* (2013.01); *C23F 11/182* (2013.01); *E21B 41/02* (2013.01); *C09K 2208/32* (2013.01)

(58) Field of Classification Search
CPC ......... C23F 11/10; C23F 11/182; C23F 11/08; C09K 8/54; C09K 8/74; E21B 41/02
See application file for complete search history.

(56) References Cited

U.S. PATENT DOCUMENTS

| | | | | |
|---|---|---|---|---|
| 2,300,393 | A | * | 11/1942 | Ayers, Jr. ............... C09K 8/72 252/193 |
| 2,905,642 | A | * | 9/1959 | Miller ...................... C10M 3/00 252/73 |
| 3,127,932 | A | | 4/1964 | Schremp |
| 3,222,289 | A | | 12/1965 | Clark |
| 4,330,419 | A | * | 5/1982 | Hall ........................ C23G 1/02 134/41 |
| 4,389,371 | A | | 6/1983 | Wilson et al. |
| 4,679,631 | A | * | 7/1987 | Dill ......................... C09K 8/528 166/307 |
| 5,441,929 | A | * | 8/1995 | Walker ...................... C09K 8/54 166/307 |
| 6,001,186 | A | | 12/1999 | Johnson et al. |
| 6,506,711 | B1 | | 1/2003 | Shuchart et al. |
| 9,228,151 | B1 | * | 1/2016 | Simonetti ............ C10M 141/12 |
| 10,005,952 | B2 | * | 6/2018 | Reyes ...................... C09K 8/74 |
| 2003/0162671 | A1 | * | 8/2003 | Kalota .................. C01M 173/02 508/154 |
| 2004/0254079 | A1 | | 12/2004 | Frenier et al. |
| 2005/0016731 | A1 | | 1/2005 | Rae et al. |
| 2006/0131022 | A1 | | 6/2006 | Rae et al. |
| 2006/0219661 | A1 | | 10/2006 | Towse et al. |
| 2006/0264335 | A1 | * | 11/2006 | Penna ...................... C09K 8/52 507/244 |
| 2006/0281636 | A1 | | 12/2006 | Smith et al. |
| 2007/0235189 | A1 | | 10/2007 | Milne et al. |
| 2008/0006409 | A1 | | 1/2008 | Brown et al. |
| 2008/0280046 | A1 | | 11/2008 | Bryden et al. |
| 2011/0065614 | A1 | | 3/2011 | Walker |
| 2011/0100630 | A1 | * | 5/2011 | Evans ...................... C09K 8/74 166/305.1 |
| 2011/0286802 | A1 | | 11/2011 | Persson et al. |
| 2012/0048808 | A1 | * | 3/2012 | Zhou ........................ C02F 5/10 210/696 |
| 2012/0238479 | A1 | | 9/2012 | Choudhary et al. |

(Continued)

FOREIGN PATENT DOCUMENTS

WO    WO2016/089394    *    6/2016    ............. E21B 43/27

OTHER PUBLICATIONS

Baxter et al., Experience and Guidance in the Use of Titanium Components in Steel Caternary Riser Systems, OTC 18624, 2007.
Hua et al., Corrosion of Ti Grade 7 and Other Ti Alloys in Nuclear and Waste Repository Environments—A Review, Corrosion 2004, Paper No. 04689.
Kalfayan, Leonard, Ultradeep HP-HT Completions, J. Petroleum Technologies, Mar. 2007, p. 83.

(Continued)

*Primary Examiner* — Angela M DiTrani
(74) *Attorney, Agent, or Firm* — Thomas Rooney; Tumey L.L.P.

(57) ABSTRACT

Some sensitive metal surfaces are often unable to be contacted effectively with hydrofluoric acid or acidic fluoride ions due to significant corrosion issues that may occur. Metal surfaces comprising titanium or a titanium alloy represent but one example of sensitive metal surfaces having this issue. Corrosion inhibitor compositions comprising boric acid and other boron-containing compounds may at least partially suppress corrosion of titanium and titanium alloy surfaces. Methods for suppressing corrosion may comprise: contacting a metal surface comprising titanium or a titanium alloy with a corrosion inhibitor composition comprising a boron-containing compound; and interacting the metal surface with a fluid phase comprising hydrofluoric acid or acidic fluoride ions.

20 Claims, 2 Drawing Sheets

(56) References Cited

U.S. PATENT DOCUMENTS

| | | |
|---|---|---|
| 2012/0325485 A1 | 12/2012 | Qu et al. |
| 2013/0269946 A1 | 10/2013 | Dziekonski |
| 2013/0269947 A1 | 10/2013 | Shilling et al. |
| 2016/0177170 A1* | 6/2016 | Janak .................. C09K 8/74 507/242 |
| 2016/0265316 A1 | 9/2016 | Reyes et al. |

OTHER PUBLICATIONS

Mainier et al., Evaluation of Titanium in Hydrochloric Acid Solutions Containing Corrosion Inhibitors, IOSR Journal of Mechanical and Civil Engineering, vol. 10, Issue 1, 2013.

Jaramillo et al., Matrix Acid Systems for Formations with High Clay Content, Discloses Use of Fluoroboric Acid and Citric Acid to Acidize, SPE 126719, 2010.

Sutter et al., The Behavior of Titanium in Nitric-Hydrofluoric Acid Solutions, Corrosion Science, V. 30, No. 4/5, 1990 pp. 461-476.

Portier et al., "Review on chemical stimulation techniques in oil industry and applications to geothermal systems," May 2007, CREGE, Work Package 4, Participant No. 28.

Lingling et al., "Compatibility and Phase Behavior Studies Between Corrosion Inhibitor and Surfactants-Based Acids," 2012, Society of Petroleum Engineers, SPE international Symposium and Exhibition on Formation Damage Control.

\* cited by examiner

METHODS AND SYSTEMS UTILIZING A BORON-CONTAINING CORROSION INHIBITOR FOR PROTECTION OF TITANIUM SURFACES

CROSS-REFERENCE TO RELATED APPLICATIONS

The present application is a continuation-in-part of U.S. patent application Ser. No. 14/818,660, filed on Aug. 5, 2015, which claims the benefit of priority under 35 U.S.C. § 119 from U.S. Provisional Patent Application 62/131,487, filed on Mar. 11, 2015.

BACKGROUND

The present disclosure generally relates to corrosion and, more specifically, to methods and systems for suppressing corrosion of titanium and titanium alloy surfaces.

Corrosive environments comprising an acid can cause severe corrosion damage to many types of metal surfaces. As used herein, the term "corrosion" and grammatical variants thereof refer to any reaction between a metal surface and its surrounding environment that causes a deterioration or change in the metal surface's properties or morphology. Examples of corrosion damage to a metal surface include, but are not limited to, rusting, metal dissolution or erosion, pitting, peeling, blistering, patina formation, cracking, embrittlement, and any combination thereof.

Acidic fluids are frequently utilized in the course of various commercial processes, such as when conducting various treatment operations in a subterranean wellbore. Corrosion-induced damage of metal surfaces during such processes can be highly undesirable. Corrosion of metal surfaces within a wellbore, such as tubulars and tools, for example, can be highly undesirable due to the difficulty, cost, and production downtime associated with replacing or repairing such components. In many instances, elevated temperatures within subterranean formations can also dramatically accelerate downhole corrosion rates. Regardless of its location and origin, corrosion-induced damage of a metal surface can represent a significant safety and/or environmental concern due to potential well failure issues.

Metal surfaces in fluid communication with a wellbore can likewise be susceptible to corrosion and its undesirable effects. Outside the wellbore, corrosion can occur prior to or during introduction of an acidic subterranean treatment fluid to the wellbore, during or following production of a spent or partially spent acidic subterranean treatment fluid, or any combination thereof. Metal components of surface well assemblies and systems, pipelines, and production facilities can be particularly susceptible in this regard. In subsea wellbores, a subsea riser structure extending from the wellbore (e.g., via a blowout preventer) to a platform or vessel on the ocean's surface or just below the ocean's surface can similarly be susceptible to corrosion during production of a partially spent acidic subterranean treatment fluid from the wellbore. The risk of corrosion to various components of a wellbore system can be so significant in some instances that exclusion of potentially corrosive agents may be warranted, possibly limiting the realm of subterranean treatment operations that are available to a well operator.

Organic corrosion inhibitors may be used to mitigate the corrosive effects of some mineral and organic acids, but not all, and numerous limitations exist. Certain metals are also more susceptible to the effects of corrosion than are others, and successful corrosion inhibitor strategies for one metal do not necessarily work for another. As used herein, the terms "inhibit," "inhibitor," "inhibition" and other grammatical forms thereof refer to the lessening of the tendency of a phenomenon to occur and/or the degree to which that phenomenon occurs. The terms "suppress," "suppression" and other grammatical forms thereof may be used equivalently herein. The terms "inhibit" and equivalents thereof do not imply any particular extent or amount of inhibition or suppression unless otherwise specified herein.

Hydrofluoric acid- and acidic fluoride-containing fluids can be especially corrosive toward certain types of sensitive metal surfaces, such as those containing titanium or a titanium alloy. Titanium and titanium alloys are lightweight, strong and resistant to most formation fluids and a great number of common subterranean treatment fluids, including those containing organic acids and/or mineral acids such as hydrochloric acid. However, titanium and titanium alloys are especially prone to corrosion by even modest quantities of hydrofluoric acid or fluoride ions at pH values of about 7 or less. Moreover, conventional organic corrosion inhibitors are not especially effective for protecting titanium and titanium alloys against corrosion promoted by hydrofluoric acid. Without being bound by any theory or mechanism, it is believed that the extreme reactivity of titanium toward these types of fluids is due to removal of a passivating surface oxide by hydrofluoric acid. The extreme sensitivity of titanium and titanium alloys to hydrofluoric acid and acidic fluoride ions can preclude the use of hydrofluoric acid in various situations where this acid might otherwise be desirable. For example, titanium and titanium alloys are frequently present in expansion or stress joints of subsea riser structures and other components of wellbore systems, which can make stimulation operations very difficult to conduct in deepwater wellbores and other wellbores containing a siliceous material. Similar issues may be encountered in other industrial processes in which hydrofluoric acid or acidic fluoride ions come into contact with titanium-containing components.

Although inhibited, corrosion-resistant titanium alloys (e.g., Ti Grade 29 alloy, which is inhibited by small amounts of ruthenium, or Ti Grade 7 alloy, which is inhibited by small amounts of palladium) can display a decreased propensity toward corrosion in the presence of hydrofluoric acid or acidic fluoride ions compared to pristine titanium or uninhibited alloys (e.g., commercially pure titanium, CP-Ti), corrosion is often still an issue. Moreover, cost and sourcing of inhibited titanium alloys can be problematic, especially for large-scale operations.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
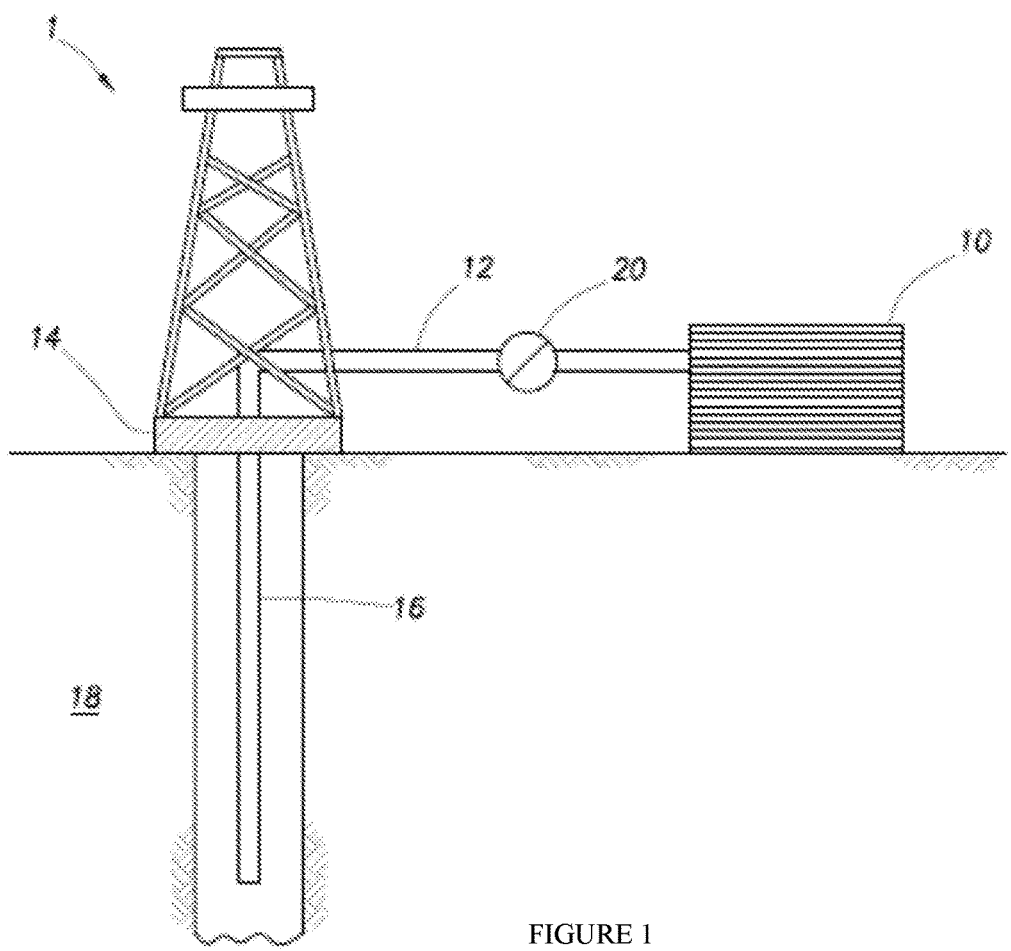
FIG. 1 shows an illustrative schematic of a system that can deliver corrosion inhibitor compositions of the present disclosure to a downhole location, according to one or more embodiments.

The present disclosure generally relates to corrosion and, more specifically, to methods and systems for suppressing corrosion of titanium and titanium alloy surfaces.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, corrosion of metal surfaces can be detrimental in various process settings. It can be very difficult, in particular, to mitigate corrosion of sensitive metal surfaces, such as titanium and titanium alloy surfaces, for example, by even dilute concentrations of hydrofluoric acid or acidic fluoride ions. Short of not using hydrofluoric acid at all, there are presently few choices for mitigating corrosion of titanium surfaces by hydrofluoric acid or acidic fluoride ions other than by using expensive and scarce inhibited titanium alloys, and even this approach may not be sufficient to prevent excessive corrosion from occurring.

The present inventors discovered that boron-containing compounds, particularly boric acid or various precursors thereof, may effectively reduce corrosion of metal surfaces comprising titanium or a titanium alloy that are in contact with a fluid phase comprising hydrofluoric acid and/or acid fluoride ions. In some instances, the fluid phase may be a subterranean treatment fluid or an at least partially spent variant thereof. Acids, salts, or complexes containing phosphorus, arsenic or antimony may be used as an alternative to boron in some embodiments. Optionally, an organic corrosion inhibitor can also be present in combination with a boron-containing compound to provide further corrosion inhibition of the sensitive metal surface. Illustrative organic corrosion inhibitors that can be suitable in this regard are provided below. Further optionally, a corrosion inhibitor intensifier or similar substance may be present, such as acids, salts or complexes containing antimony, bismuth, titanium, molybdenum, vanadium, aluminum, or certain other metals.

In further embodiments, a boron-containing compound or an alternative thereof may be combined with multiple corrosion inhibitor intensifiers comprising both a metallic agent and an electrochemically active species in a corrosion inhibitor composition. Tailoring the corrosion inhibitor composition in this manner may induce an electrochemical reaction at the titanium or titanium alloy surface, which may confer further corrosion protection to the sensitive metal surface (e.g., through in situ electrodeposition of a metal coating upon the titanium or titanium alloy surface). In more particular embodiments, the corrosion inhibitor composition may comprise a mixture of acids, salts or complexes of 1) boron, phosphorus, arsenic, or antimony, 2) titanium, aluminum, tin, lanthanum, or zirconium, and 3) tungsten, molybdenum, copper, bismuth, niobium, ruthenium, rhenium, vanadium, or cobalt. Flow rates within the surface components of the wellbore system may be sufficiently small to allow in situ electrodeposition to occur effectively. At faster flow rates, there may not be sufficient time for electrodeposition to occur.

The corrosion inhibitor compositions disclosed herein can be particularly desirable for use in conjunction with various fluid phases, especially subterranean treatment fluids or at least partially spent subterranean treatment fluids. Subterranean treatment fluids can be utilized in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the subterranean treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

As used herein, the term "at least partially spent subterranean treatment fluid" refers to a subterranean treatment fluid comprising residual hydrofluoric acid and/or acidic fluoride ions that is/are formed upon interaction of hydrofluoric acid with a reactive material, such as a siliceous material. In some instances, initial introduction of a subterranean treatment fluid comprising hydrofluoric acid or a hydrofluoric acid-generating compound to a wellbore may take place without inducing corrosive effects. However, after introducing the subterranean treatment fluid to the wellbore and allowing the hydrofluoric acid to at least partially react, such as during dissolution of a siliceous material, production of the at least partially spent treatment fluid can become problematic. At this juncture or before, a boron-containing compound may be introduced to the at least partially spent subterranean treatment fluid to provide corrosion inhibition, thereby allowing its production to take place. Surface, subsurface and subsea metal surfaces may be protected in this manner. By introducing the boron-containing compound to the subterranean treatment fluid separately, after the hydrofluoric acid has reacted in the course of performing its intended function, any potential change in the hydrofluoric acid's reactivity profile may be averted. Alternately, the boron-containing compound may be added to the subterranean treatment fluid prior to its introduction to the wellbore, thereby averting potential pre-treatment corrosion issues at the surface components of the wellbore system. In either case, once the boron-containing compound is present, the at least partially spent subterranean treatment fluid may be contacted effectively with a sensitive metal surface comprising titanium or a titanium alloy, such as during production or earlier. Surface wellbore systems and components thereof that may be protected by practicing the disclosure herein include, for example, land-based production facilities, Floating Production Storage and Offloading (FPSO) units, pipelines, carrier vessels, and the like. Illustrative titanium-containing components that may be protected from corrosion include, for example, oil and gas heat exchangers, storage tanks, separator tanks or towers, piping, elbows, tee fittings, clad, flanges, gaskets, valves, stems, the like, and any combination thereof. More specific example of wellbore system or pipeline components that may contain titanium or titanium alloys include, for example, oil and gas separators, free-water knockouts, gas scrubbers, pumps, compressors, and the like. Geothermal wells and subsea wells may include well casings composed of titanium or titanium alloys that may be protected in a similar manner.

In some embodiments, the titanium or titanium alloy may be present in a conduit through which the at least partially spent subterranean treatment fluid is produced, such as a subsea riser structure or certain types of well casings. Subsea riser structures and other components of various wellbore systems may contain titanium-based stress joints, for example.

Ultimately, the methods of the present disclosure may allow hydrofluoric acid-based treatment operations to take place in situations where they might otherwise not be possible, such as when a metal surface comprising titanium or a titanium alloy is in fluid communication with a wellbore. For example, the methods of the present disclosure may allow hydrofluoric acid-based treatment operations to take place when titanium or titanium alloys are present within a surface well assembly, a subsea riser structure extending hundreds to thousands of feet below the water line, or wellbore casing.

Although the features of the present disclosure may be particularly advantageous when used in conjunction with subterranean treatment operations, a corrosion inhibitor composition comprising a boron-containing compound may be used similarly to suppress corrosion of titanium or titanium alloy surfaces in any type of in-process setting. For example, boric acid or a precursor thereof may suppress corrosion of a metal surface comprising titanium or a titanium alloy in a plant or process setting in which hydrofluoric acid is used. Illustrative plant or process settings in which boric acid or a precursor thereof may be used to inhibit corrosion include, for example, manufacturing processes using dilute hydrofluoric acid solutions, storage and transport structures for dilute hydrofluoric acid solutions, and the like.

In some embodiments, methods described herein may comprise: contacting a metal surface comprising titanium or a titanium alloy with a corrosion inhibitor composition comprising a boron-containing compound; and interacting the metal surface with a fluid phase comprising hydrofluoric acid or acidic fluoride ions.

In some embodiments, the fluid phase may comprise a subterranean treatment fluid comprising hydrofluoric acid, or an at least partially spent subterranean treatment fluid comprising residual hydrofluoric acid or acidic fluoride ions. Such subterranean treatment fluids may be collectively referred to herein as "inhibited subterranean treatment fluids." In some embodiments, an inhibited subterranean treatment fluid formed in accordance with the above disclosure may contact a sensitive metal surface at a location before introduction of the fluid phase into a wellbore. In other embodiments, an inhibited subterranean treatment fluid may contact a sensitive metal surface at a location after introduction to a wellbore, such as during production. In more specific embodiments, the inhibited subterranean treatment fluid may contact a sensitive metal surface comprising a surface component of a wellbore system. Illustrative surface components of a wellbore system are discussed further herein.

In more specific embodiments, methods described herein may comprise: introducing a subterranean treatment fluid comprising hydrofluoric acid or a hydrofluoric acid-generating compound to a subterranean formation; forming an at least partially spent subterranean treatment fluid in the subterranean formation; adding a corrosion inhibitor composition comprising a boron-containing compound to the at least partially spent subterranean treatment fluid in the subterranean formation, thereby forming an inhibited subterranean treatment fluid in the subterranean formation; and contacting the inhibited subterranean treatment fluid with a metal surface comprising titanium or a titanium alloy.

In various embodiments, the boron-containing compound may suppress corrosion of the metal surface by hydrofluoric acid or acidic fluoride ions. The corrosion-inhibiting effects exhibited by the boron-containing compound may include those noted above. The boron-containing compound may directly inhibit corrosion of the metal surface, or it may undergo a transformation following its introduction to the subterranean formation to form a boron-containing compound that is capable of suppressing corrosion. Without being bound by any theory or mechanism, it is believed that the open p-orbital on the boron center may form a Lewis acid-base complex with fluoride ions to promote corrosion inhibition in the embodiments of the present disclosure.

In more particular embodiments, the boron-containing compound may comprise boric acid or a precursor thereof. Suitable boric acid precursors are discussed below. In some embodiments, boric acid may be added directly to a subterranean treatment fluid or similar fluid phase. In other embodiments, boric acid may be generated from a boric acid precursor that is added to a subterranean treatment fluid or similar fluid phase and undergoes subsequent conversion therein. In some embodiments, boric acid may be generated from borax and an acid such as hydrochloric acid. Other suitable boric acid precursors may include, for example, tetraborates (e.g., sodium tetraborate), tetrafluoroborates, metal borate ligand complexes (ligand=oxalic acid, citric acid, glycolic acid, lactic acid, tartaric acid, malic acid, maleic acid, succinic acid, N-phosphonomethyliminodiacetic acid (PMIDA) and the like), boronic acids, boronate esters, organotrifluoroborates, boron trihalides and polymeric borates. Another class of suitable boron-containing compounds includes boron-amine complexes, particularly boron-alkanolamine complexes. Triethanolamine borate is a representative member of this class of complexes and can be particularly suitable due to its high aqueous solubility.

The chosen concentration of the boron-containing compound in the fluid phase may represent an effective amount to counterbalance the corrosive effects resulting from the quantity of hydrofluoric acid and/or acidic fluoride ions that is present when interacting with the metal surface. In various embodiments, a concentration of the boron-containing compound in the fluid phase may range between about 0.5 wt. % and about 30 wt. %, or between about 0.5 wt. % and about 20 wt. %, or between about 0.5 wt. % and about 14 wt. %, or between about 2 wt. % and about 14 wt. %, or between about 2 wt. % and about 10 wt. %. Boron-alkanolamine complexes can be particularly desirable due to their good aqueous solubility, which can allow them to be present in concentrations exceeding about 15 wt. %.

In many instances, the corrosion inhibitor composition may be present in the fluid phase when the fluid phase interacts with the metal surface. The corrosion inhibitor composition may be added to the fluid phase at any location before interaction with the metal surface takes place. For example, in the case of a subterranean treatment fluid, it may be convenient to add the corrosion inhibitor composition comprising the boron-containing compound to the at least partially spent subterranean treatment fluid in the wellbore. However, in alternative embodiments, the corrosion inhibitor composition may also be introduced to the at least partially spent subterranean treatment fluid at any other location before contact with the metal surface takes place. In some embodiments, for example, the corrosion inhibitor composition may be added to the at least partially spent subterranean treatment fluid during production, provided that such addition takes place upstream of the location at which the metal surface is contacted with the treatment fluid.

Addition of the corrosion inhibitor composition in this manner advantageously avoids downhole pumping and obviates NAS 6 or any other filterable qualifications. Addition of the corrosion inhibitor composition in either of the foregoing manners may be suitable when corrosion of various surface components of the wellbore system is problematic during production but not necessarily when introducing the subterranean treatment fluid to the wellbore. Similar benefits may be realized when producing the at least partially spent subterranean treatment fluid through a location separate from the wellbore, such as a subsea riser structure or pipeline, for example. In a specific example, the corrosion inhibitor composition may be added during production to the at least partially spent subterranean treatment fluid in a subsea riser structure at a location below which a titanium or titanium alloy stress joint is present.

In alternative embodiments, the corrosion inhibitor composition may be added to a subterranean treatment fluid prior to its introduction to a wellbore or during its introduction to a wellbore. Addition of the corrosion inhibitor composition at either of these locations may be feasible if the corrosion inhibitor composition does not detrimentally impact the hydrofluoric acid's reactivity and/or if a sensitive metal surface comprising titanium or a titanium alloy is encountered by the subterranean treatment fluid in transit to or within a wellbore. Addition of the corrosion inhibitor composition during introduction of the subterranean treatment fluid to the wellbore may be performed in an on-the-fly manner. Regardless of how or when the corrosion inhibitor composition is introduced, it may subsequently protect a metal surface comprising titanium or a titanium alloy during production in a manner similar to that described above.

In still other alternative embodiments, the corrosion inhibitor composition may contact the metal surface before the fluid phase interacts with the metal surface. Contacting the metal surface with the corrosion inhibitor composition in this manner may leave the metal surface desirably conditioned for a subsequent interaction with hydrofluoric acid or acidic fluoride ions.

The fluid phases of the present disclosure, particularly subterranean treatment fluids and corrosion inhibitor compositions, may comprise an aqueous carrier fluid or an oleaginous carrier fluid as their continuous phase. Suitable aqueous carrier fluids may include, for example, fresh water, acidified water, salt water, seawater, produced water, recycled water, brackish water, flowback water, brine (e.g., a saturated salt solution), or an aqueous salt solution (e.g., a non-saturated salt solution). Aqueous carrier fluids may be obtained from any suitable source.

In some embodiments, an aqueous carrier fluid may be chosen such that it is substantially free of alkali metal ions. Choice of an aqueous carrier fluid that is substantially free of alkali metal ions may be desirable in order to limit re-precipitation of alkali metal silicates and fluorosilicates upon dissolution of a siliceous material by a subterranean treatment fluid. For purposes of this disclosure, an aqueous carrier fluid or a subterranean treatment fluid formed therefrom will be considered to be substantially free of alkali metal ions if less than about 1 wt. % alkali metal ions are present.

In some embodiments, an organic co-solvent may be included with an aqueous carrier fluid. Suitable organic co-solvents may include, but are not limited to, glycols and alcohol solvents, for example. When present, the amount of the organic co-solvent may range between about 1% to about 50% by volume of the subterranean treatment fluid or corrosion inhibitor composition.

In other various embodiments, the carrier fluid may comprise an oleaginous carrier fluid. Suitable oleaginous carrier fluids may include, for example, an organic solvent, a hydrocarbon, oil, a refined component of oil, or any combination thereof.

In some embodiments, the hydrofluoric acid may be formed from a hydrofluoric acid-generating compound. Suitable hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, titanium fluorides, boron trifluoride and various boron trifluoride complexes.

In some embodiments, an acid or an acid-generating compound may be present in combination with hydrofluoric acid or a hydrofluoric acid-generating compound in the fluid phase. The acid or acid-generating compound and its amount may be chosen to mitigate pH changes that occur as hydrofluoric acid spends, for example, such as during a reaction of the hydrofluoric acid with a siliceous material in a subterranean formation. Upon at least partial spending of the hydrofluoric acid, acidic fluoride ions can remain.

Examples of acids suitable for use in combination with hydrofluoric acid or a hydrofluoric acid-generating compound may include, but are not limited to, hydrochloric acid, hydrobromic acid, formic acid, acetic acid, chloroacetic acid, dichloroacetic acid, trichloroacetic acid, fluoroacetic acid, difluoroacetic acid, trifluoroacetic acid, methanesulfonic acid, citric acid, maleic acid, glycolic acid, lactic acid, malic acid, oxalic acid, the like, and any combination thereof. Examples of suitable acid-generating compounds may include, but are not limited to, esters, aliphatic polyesters, orthoesters, poly(orthoesters), poly(lactides), poly (glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combination thereof.

In various embodiments, a concentration of hydrofluoric acid or generatable hydrofluoric acid in the fluid phase may range between about 0.5 wt. % and about 5 wt. %. These values may represent the ultimate hydrofluoric acid concentration attainable in a subterranean treatment fluid introduced to the subterranean formation and/or the combined concentration of hydrofluoric acid and acidic fluoride ions in an at least partially spent treatment fluid. Hydrofluoric acid concentrations in this range may be particularly effective for performing various subterranean treatment operations, such as descaling and dissolution of siliceous materials, for example.

In some embodiments, a chelating agent may also be present in the fluid phase in combination with the hydrofluoric acid or hydrofluoric acid-generating compound. The optional chelating agent may increase the amount of metal ions that are complexed within the subterranean formation. For example, metal ions liberated upon dissolution of a siliceous material or a carbonate material within the subterranean formation may be complexed by the chelating agent in order to suppress their subsequent reprecipitation. When used, the chelating agent may be initially present in the subterranean treatment fluid with the hydrofluoric acid or hydrofluoric acid-generating compound, or the chelating agent may be added on-the-fly as the subterranean treatment fluid is being introduced to the wellbore.

Suitable chelating agents are not believed to be particularly limited. In illustrative embodiments, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, or the like may be present as the optional chelating agent.

In other various embodiments, an aminopolycarboxylic acid may be present as the optional chelating agent. A number of aminopolycarboxylic acids have the additional advantage of being biodegradable, which may be advantageous for their use in various subterranean treatment operations. Illustrative aminopolycarboxylic acid chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy) ethyl]glycine (BCA6), N-bis[2-(1,2-dicarboxyethoxy)ethyl] aspartic acid (BCA5), N-bis[2-(1,2-dicarboxyethoxy)ethyl] methylglycine (MCBA5), N-tris[(1,2-dicarboxyethoxy) ethyl]amine (TCA6), N-bis[2-(carboxymethoxy)ethyl] glycine (BCA3), N-bis[2-(methylcarboxymethoxy)ethyl] glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriam ine-N,N''-disucci nic acid, triethylenetetram ine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof.

In still other various embodiments, an N-(phosphonoalkyl)iminodiacetic acid or any salt thereof may be present as the optional chelating agent. Not only may such substances complex metal ions, but they may also help suppress corrosion as well, including hydrofluoric acid-induced corrosion. In illustrative embodiments, a suitable N-(phosphonoalkyl)iminodiacetic acid that may be used in the fluid phases of the present disclosure is N-(phosphonomethyl) iminodiacetic acid (PMIDA).

In some embodiments, the corrosion inhibitor composition may further comprise an organic corrosion inhibitor. The identity and amount of the organic corrosion inhibitor may vary in view of the amounts of hydrofluoric acid, the boron-containing compound and/or any salt thereof that are present, for example. The type of titanium surface may also dictate, at least in part, the identity and amount of an organic corrosion inhibitor needed to provide effective corrosion suppression. In illustrative embodiments, a concentration of the organic corrosion inhibitor in the fluid phase may range between about 0.1 wt. % to about 5 wt. %. In more specific embodiments, a concentration of the organic corrosion inhibitor may range between about 0.5 wt. % to about 5 wt. %, or between about 1 wt. % to about 3 wt. %, or between about 2 wt. % to about 4 wt. %. The organic corrosion inhibitor may be added concurrently with the boron-containing compound or separately. When added concurrently, the boron-containing compound and the organic corrosion inhibitor may be present in the same fluid stream or in different fluid streams.

Illustrative organic corrosion inhibitors may include compounds such as, for example, an acetylenic alcohol, a Mannich condensation product, an unsaturated carbonyl compound, an unsaturated ether, formamide or a reaction product thereof, a formate, an iodide, a terpene, an aromatic hydrocarbon, cinnamaldehyde or a derivative thereof, a fluorinated surfactant, a quaternary derivative of a heterocyclic nitrogen base, a quaternary derivative of a halomethylated aromatic compound, or any combination thereof. Other illustrative corrosion inhibitors may include, for example, a reaction product of an α,β-unsaturated aldehyde or ketone with a primary or secondary amine, and a reaction product of an aldehyde with a thiol and/or an amide. The reaction product may be pre-formed before placing it in the fluid phase, or it may be formed in situ from the individual components within a corrosive environment. In illustrative embodiments, suitable organic corrosion inhibitors may comprise MSA-III (a sulfur-containing organic acid corrosion inhibitor), HAI-404M (a quaternary ammonium corrosion inhibitor), or HAI-OS (an acetylenic alcohol corrosion inhibitor), each of which is available from Halliburton Energy Services.

Further optionally, a corrosion inhibitor intensifier may be present in the corrosion inhibitor composition. Corrosion inhibitor intensifiers, sometimes referred to as activators, can function to activate another corrosion inhibitor. Corrosion inhibitor intensifiers that can be used in the embodiments of the present disclosure include, for example, quaternary ammonium compounds, molybdate salts (including heteropolymolybdates), copper compounds (e.g., cuprous iodide, and cuprous chloride), antimony compounds (e.g., antimony oxides, antimony halides, antimony tartrate, antimony citrate, antimony tartrate, antimony citrate, pyroantimonate salts, and antimony adducts of ethylene glycol), bismuth compounds (e.g., bismuth oxides, bismuth halides, bismuth tartrate, and bismuth citrate), iodine, iodide compounds (e.g., potassium iodide and sodium iodide), formic acid, and any combination thereof. When present, a concentration of the corrosion inhibitor intensifier may range from about 0.1 wt. % to about 5.0 wt. % or from about 0.1 wt. % to about 8 wt. %.

In some further embodiments, a combination of corrosion inhibitor intensifiers may be chosen so as to be capable of promoting in situ electrochemistry while interacting with the sensitive metal surface. Specific examples of corrosion inhibitor intensifiers that may perform this function are provided hereinabove.

In additional embodiments, the subterranean treatment fluids and related fluid phases described herein may further comprise any number of additives that are commonly used in downhole operations including, for example, silica scale control additives, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Any combination of these additives may be used as well. One of ordinary skill in the art will be able to formulate a subterranean treatment fluid having properties suitable for a given application.

Once within a wellbore, a subterranean treatment fluid comprising hydrofluoric acid or a hydrofluoric acid-generating compound may perform various functions, such as the treatment operations described above. In more particular embodiments, the treatment operation may comprise introducing the subterranean treatment fluid to a wellbore, contacting a siliceous material in the subterranean formation with the subterranean treatment fluid, and reacting a siliceous material in the wellbore with hydrofluoric acid to form the at least partially spent subterranean treatment fluid. Reacting the siliceous material with the hydrofluoric acid may comprise at least partially dissolving the siliceous material with the subterranean treatment fluid, such that at least a portion of the hydrofluoric acid spends to produce fluoride ions. Illustrative siliceous materials that may be contacted and dissolved with the hydrofluoric acid include, for example, silica, silicates, aluminosilicates, geothermal scale, the like, and any combination thereof.

In further embodiments, the methods of the present disclosure may comprise producing the at least partially spent subterranean treatment fluid from a wellbore. In more particular embodiments, production of the at least partially spent subterranean treatment fluid may take place through a conduit containing the metal surface, such as at least a portion of a subsea riser structure. Contact between the metal surface and the at least partially spent subterranean treatment fluid may also occur at various surface components located within the wellbore system. In illustrative embodiments, the metal surface may comprise a titanium-containing stress joint.

In other various embodiments, systems configured for transporting a corrosion inhibitor composition of the present disclosure to and from a downhole location are described herein. In various embodiments, the systems can comprise a pump fluidly coupled to a tubular, the tubular containing a corrosion inhibitor composition comprising a boron-containing compound and being configured to add the corrosion inhibitor composition to a fluid phase being introduced to or produced from a subterranean formation. The fluid phase may comprise hydrofluoric acid or a hydrofluoric acid-generating compound, or an at least partially spent variant thereof. A metal surface comprising titanium or a titanium alloy may be in fluid communication with the wellbore. The metal surface may be present at any location such as within a subsea riser structure (see FIG. 2), within wellbore casing, or as surface components within the wellbore system.

The pump may be a high pressure pump in some embodiments. As used herein, the term "high pressure pump" refers to a pump that is capable of delivering a fluid downhole at a pressure of about 1000 psi or greater. A high pressure pump may be used when it is desired to introduce a corrosion inhibitor composition of the present disclosure to a subterranean formation at or above a fracture gradient of the subterranean formation, but it may also be used in cases where fracturing is not desired. The corrosion inhibitor compositions described herein may be introduced with a high pressure pump, or they may be introduced following a subterranean treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" refers to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the corrosion inhibitor composition to the high pressure pump. In such embodiments, the low pressure pump may "step up" the pressure of the corrosion inhibitor composition before it reaches the high pressure pump. Alternately, the low pressure pump may be used to directly introduce the corrosion inhibitor composition to the subterranean formation.

In some embodiments, the systems described herein can further comprise a mixing tank that is upstream of the pump and in which the corrosion inhibitor composition is formulated with a carrier fluid. In various embodiments, the pump (e.g., a low pressure pump, a high pressure pump, or a combination thereof) may convey the corrosion inhibitor composition from the mixing tank or other source to the tubular. In other embodiments, however, the corrosion inhibitor composition can be formulated offsite and transported to a worksite, in which case the corrosion inhibitor composition may be introduced to the tubular via the pump directly from its shipping container (e.g., a truck, a railcar, a barge, or the like) or from a transport pipeline. In either case, the corrosion inhibitor composition may be drawn into the pump, elevated to an appropriate pressure, and then introduced into the tubular for delivery downhole.

FIG. 1 shows an illustrative schematic of a system that can deliver corrosion inhibitor compositions of the present disclosure to a downhole location, according to one or more embodiments. It should be noted that while FIG. 1 generally depicts a land-based system, it is to be recognized that like systems may be operated in subsea locations as well. For example, the corrosion inhibitor composition may be delivered to the downhole location of a subsea wellbore using the tubular and then undergo production through a subsea riser structure, such as a subsea riser containing titanium or a titanium alloy (see FIG. 2). As depicted in FIG. 1, system 1 may include mixing tank 10, in which a corrosion inhibitor composition of the present disclosure may be formulated. The corrosion inhibitor composition may be conveyed via line 12 to wellhead 14, where the corrosion inhibitor composition enters tubular 16, tubular 16 extending from wellhead 14 into subterranean formation 18. Tubular 16 may include orifices that allow the corrosion inhibitor composition to enter into the wellbore. Pump 20 may be configured to raise the pressure of the corrosion inhibitor composition to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It is also to be recognized that the disclosed corrosion inhibitor compositions and subterranean treatment fluids may also directly or indirectly affect the various downhole equipment and tools that may come into contact with these materials during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Figure 2:
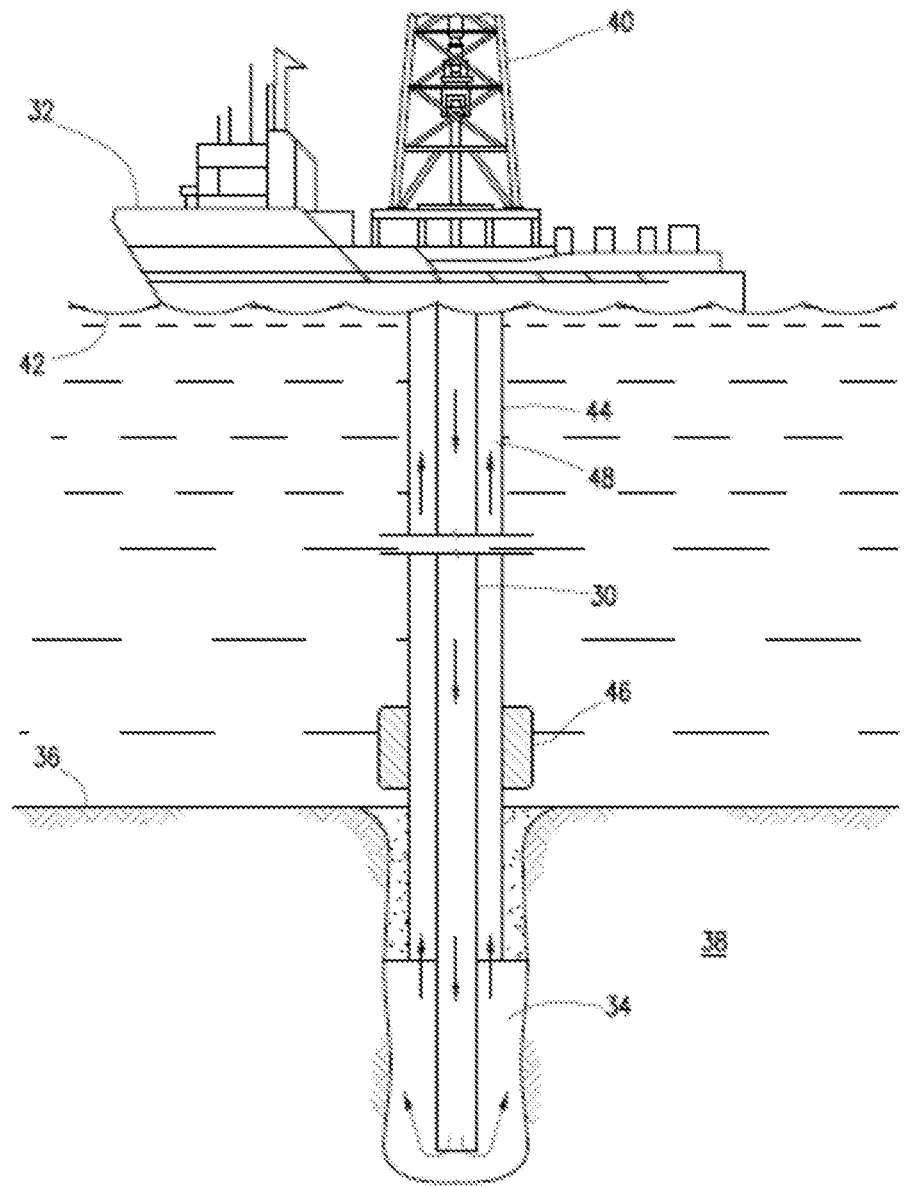
FIG. 2 shows an illustrative schematic of a subsea riser structure in fluid communication with a wellbore.

FIG. 2 shows an illustrative schematic of a subsea riser structure in fluid communication with a wellbore. As shown in FIG. 2, tubular 30 extends from platform or ship 32 into wellbore 34, which extends below seabed 36 and penetrates subterranean formation 38. Tubular 30 may be similar to that shown in system 1 of FIG. 1 and may be better understood by reference thereto. Rig 40 resides upon platform or ship 32 above waterline 42. Subsea riser structure 44 extends between platform or ship 32 and wellbore 34, spanning at least the distance between waterline 42 and seabed 36 and also passing through blowout preventer 46. Tubular 30 resides within subsea riser structure 44, and annular space 48 is defined therebetween.

A subterranean treatment fluid comprising hydrofluoric acid or a hydrofluoric acid-generating compound may be introduced to wellbore 34 through tubular 30 or a secondary conduit (not depicted). Upon interacting the hydrofluoric acid with a siliceous material, the subterranean treatment fluid becomes at least partially spent. Before producing the at least partially spent subterranean treatment fluid from wellbore 34 through annulus 48 of subsea riser structure 44, a corrosion inhibitor composition is also added via tubular 30 or a secondary conduit, thus inhibiting the at least partially spent subterranean treatment fluid as described above. The corrosion inhibitor composition may be added into wellbore 34 or within subsea riser structure 44 at a location upstream of a titanium or titanium alloy surface. Accordingly, the corrosion inhibitor composition may suppress corrosion of a titanium or titanium alloy surface within subsea riser structure 44 upon production. Protection of sensitive surface components within the wellbore system may occur similarly.

Embodiments disclosed herein include:

A. Methods for suppressing corrosion. The methods comprise: contacting a metal surface comprising titanium or a titanium alloy with a corrosion inhibitor composition comprising a boron-containing compound; and interacting the metal surface with a fluid phase comprising hydrofluoric acid or acidic fluoride ions.

Embodiment A may have one or more of the following additional elements in any combination:

Element 1: wherein the fluid phase further comprises an acid or an acid-generating compound.

Element 2: wherein the corrosion inhibitor composition is present in the fluid phase when the fluid phase interacts with the metal surface.

Element 3: wherein the corrosion inhibitor composition contacts the metal surface before the fluid phase interacts with the metal surface.

Element 4: wherein the fluid phase comprises a subterranean treatment fluid or an at least partially spent subterranean treatment fluid.

Element 5: wherein the fluid phase comprises a subterranean treatment fluid and interacts with the metal surface at a location before introduction of the fluid phase into a wellbore.

Element 6: wherein the fluid phase comprises an at least partially spent subterranean treatment fluid and interacts with the metal surface at a location after production of the fluid phase from a wellbore.

Element 7: wherein the method further comprises introducing the subterranean treatment fluid into the wellbore; and reacting a siliceous material in the wellbore with hydrofluoric acid to form the at least partially spent subterranean treatment fluid.

Element 8: wherein the metal surface is in fluid communication with a wellbore.

Element 9: wherein the metal surface is present in a surface component of a wellbore system.

Element 10: wherein the wellbore system comprises a titanium-containing stress joint.

Element 11: wherein the boron-containing compound comprises boric acid or a precursor thereof.

Element 12: wherein the corrosion inhibitor composition further comprises an organic corrosion inhibitor.

Element 13: wherein the fluid phase further comprises a chelating agent.

Element 14: wherein the chelating agent comprises an N-(phosphonoalkyl)iminodiacetic acid or any salt thereof.

Element 15: wherein the N-(phosphonoalkyl)iminodiacetic acid comprises N-(phosphonomethyl)iminodiacetic acid.

Element 16: wherein the subterranean treatment fluid comprises an aqueous carrier fluid that is substantially free of alkali metal ions.

Element 17: wherein the siliceous material is selected from the group consisting of silica, silicates, aluminosilicates, geothermal scale, and any combination thereof.

Element 18: wherein the corrosion inhibitor composition further comprises a corrosion inhibitor intensifier.

Element 19: wherein the titanium alloy is an uninhibited titanium alloy.

By way of non-limiting example, exemplary combinations applicable to A include:

The method of A in combination with elements 1 and 2; 1 and 3; 1 and 5; 1 and 6; 1 and 11; 4 and 5; 6 and 7; 5, 8 and 9; 5, 6 and 9; 8 and 10; 9 and 10; 11 and 12; 1, 11 and 12; and 1, 11, 12 and 14.

To facilitate a better understanding of the embodiments of the present disclosure, the following examples of preferred or representative embodiments are given. In no way should the following examples be read to limit, or to define, the scope of the disclosure.

EXAMPLES

Example 1

Treatment fluids comprising 1% hydrofluoric acid, 5 wt. % CLA-WEB stabilizing additive (Halliburton Energy Services), MGDA, and various quantities of boric acid were exposed to a titanium alloy over a period of time in the presence of an additional corrosion inhibitor. Testing conditions and results are further summarized in Table 1.

TABLE 1

| Ti Alloy | Temperature (° F.) | Time (hr) | Additional Corrosion Inhibitor | Boric Acid (%) | Corrosion Loss (lb/ft$^2$) | Additives |
|---|---|---|---|---|---|---|
| Ti-29 | 140 | 6 | 2.5% MSA-III | 4 | 0.013 | none |
| Ti-29 | 140 | 6 | 2.5% HAI-OS | 4 | 0.0057 | none |
| Ti-1 | 250 | 3 | 1% HAI-OS | 4 | 0.073 | none |
| Ti-1 | 250 | 3 | 1% MSA-III | 4 | 0.079 | none |
| Ti-1 | 200 | 3 | 1% MSA-III | 4 | 0.042 | none |
| Ti-1 | 250 | 3 | 1% MSA-III | 0 | 0.128 | 2% ZrOCl$_2$ |
| Ti-1 | 250 | 3 | 1% MSA-III | 0 | 0.072 | 4% ZrOCl$_2$ |
| Ti-1 | 250 | 3 | 1% MSA-III | 3 | 0.061 | 4% ZrOCl$_2$ |

As shown in Table 1, significantly less corrosion loss usually occurred when boric acid was present compared to when it was not. Effective corrosion suppression for even uninhibited Ti-1 alloy was realized in the presence of boric acid. The impact of ZrOCl$_2$ was negligible under the test conditions.

Example 2

A Ti Grade 29 substrate was exposed for 6 hours at constant temperature to various treatment fluids comprising 1% hydrofluoric acid generated from ammonium bifluoride in water and having a pH of 2.8. In addition, the treatment fluids comprised 4 wt. % boric acid, 5 wt. % CLA-WEB stabilizing additive, 0.5 wt. % surfactant, and MGDA. Testing conditions and results are summarized in Table 2. N-(phosphonomethyl)iminodiacetic acid (PMIDA) was present in certain fluids (see Table 2).

TABLE 2

| Ti Alloy | Temperature (° F.) | [HF] (wt. %) | [PMIDA] (wt. %) | Additional Corrosion Inhibitor | Corrosion Loss (lb/ft$^2$) |
|---|---|---|---|---|---|
| Ti-29 | 140 | 1 | none | MSA-III (2.5 wt. %) | 0.013 |
| Ti-29 | 140 | 1 | 2.5 | none | 0.000 |
| Ti-29 | 140 | 1 | none | HAI-OS (2.5 wt. %) | 0.005 |

As shown in Table 2, low corrosion loss rates were observed in the presence of boric acid. When PMIDA was present, an even lower corrosion loss rate was realized. No obvious pitting of the substrate was evident, particularly in the presence of PMIDA.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   contacting a metal surface consisting of titanium or a titanium alloy with a corrosion inhibitor composition comprising a boron-containing compound, wherein the boron-containing compound comprises a boron-alkanolamine complex;
   interacting the metal surface with a fluid phase comprising hydrofluoric acid or acidic fluoride ions; and
   suppressing corrosion of the metal surface by the hydrofluoric acid or acidic fluoride ions with the boron-containing compound.

2. The method of claim 1, wherein the fluid phase further comprises an acid or an acid-generating compound.

3. The method of claim 1, wherein the corrosion inhibitor composition is present in the fluid phase when the fluid phase interacts with the metal surface.

4. The method of claim 1, wherein the corrosion inhibitor composition contacts the metal surface before the fluid phase interacts with the metal surface.

5. The method of claim 1, wherein the fluid phase comprises a subterranean treatment fluid or an at least partially spent subterranean treatment fluid.

6. The method of claim 5, wherein the fluid phase comprises a subterranean treatment fluid and interacts with the metal surface at a location before introduction of the fluid phase into a wellbore.

7. The method of claim 5, wherein the fluid phase comprises an at least partially spent subterranean treatment fluid and interacts with the metal surface at a location after production of the fluid phase from a wellbore.

8. The method of claim 7, further comprising:
   introducing the subterranean treatment fluid into the wellbore; and
   reacting a siliceous material in the wellbore with hydrofluoric acid to form the at least partially spent subterranean treatment fluid.

9. The method of claim 8, wherein the subterranean treatment fluid comprises an aqueous carrier fluid that is substantially free of alkali metal ions.

10. The method of claim 8, wherein the siliceous material is selected from the group consisting of silica, silicates, aluminosilicates, geothermal scale, and any combination thereof.

11. The method of claim 5, wherein the metal surface is in fluid communication with a wellbore.

12. The method of claim 11, wherein the metal surface is present in a surface component of a wellbore system.

13. The method of claim 12, wherein the wellbore system comprises a titanium-containing stress joint.

14. The method of claim 1, wherein the corrosion inhibitor composition comprises the boron-alkanolamine complex in excess of about 15 wt. %.

15. The method of claim 1, wherein the corrosion inhibitor composition further comprises an organic corrosion inhibitor.

16. The method of claim 1, wherein the fluid phase further comprises a chelating agent.

17. The method of claim 16, wherein the chelating agent comprises an N-(phosphonoalkyl)iminodiacetic acid or any salt thereof.

18. The method of claim 17, wherein the N-(phosphonoalkyl)iminodiacetic acid comprises N-(phosphonomethyl)iminodiacetic acid.

19. The method of claim 1, wherein the corrosion inhibitor composition further comprises a corrosion inhibitor intensifier.

20. The method of claim 1, wherein the titanium alloy is an uninhibited titanium alloy.

* * * * *